United States Patent [19]
Marrié

[11] 3,807,297
[45] Apr. 30, 1974

[54] AUTOMATIC CITRUS FRUIT SQUEEZING DEVICE

[75] Inventor: Paul A. Marrié, Dijon, France

[73] Assignee: Societe Etud, Zone Industrielle, Quetigny, France

[22] Filed: Feb. 14, 1972

[21] Appl. No.: 226,121

[30] Foreign Application Priority Data
July 8, 1971 France..........................71.24994

[52] U.S. Cl.................. 100/116, 100/213, 100/238
[51] Int. Cl.............................................. B30b 9/06
[58] Field of Search............ 100/37, 104, 116, 213, 100/218, 125, 238; 99/495, 509, 510

[56] References Cited
UNITED STATES PATENTS

| | | | |
|---|---|---|---|
| 410,789 | 9/1889 | Easley | 100/238 X |
| 530,268 | 12/1894 | Hensel | 100/238 X |
| 1,053,590 | 2/1913 | Gilchrist | 100/238 X |
| 2,692,550 | 10/1954 | Smith | 100/213 |
| 2,703,522 | 3/1955 | Smith | 100/213 X |
| 3,377,947 | 4/1968 | Richard | 100/238 X |

FOREIGN PATENTS OR APPLICATIONS

| | | | |
|---|---|---|---|
| 1,260,092 | 3/1961 | France | 100/213 |

*Primary Examiner*—Peter Feldman
*Attorney, Agent, or Firm*—Cushman, Darby & Cushman

[57] ABSTRACT

An electromechanical device used for squeezing citrus fruits which includes a female cone driven by a motor situated in the upper part of the device and a stationary male cone resting on the receptacle for fruit juices serving as a stand for the device and adapted to enter and define with the female cone a cavity for squeezing a citrus fruit.

8 Claims, 2 Drawing Figures

AUTOMATIC CITRUS FRUIT SQUEEZING DEVICE

BACKGROUND OF THE INVENTION

1. Field of the Invention

This invention relates to devices for removing juice from citrus fruits.

2. Description of the Prior Art

There exists now multiple proposals for electric household devices used for squeezing citrus fruits to extract and collect their juice. In general they consist of a fluted one, made of plastic or glass, which can be rotated by an electric motor while the fruit half is being hand pressed on the cone.

Such devices have certain disadvantages: it is often necessary to hold and guide the fruit half by hand during the rotation of the cone, with the result that the hand is always soiled. Furthermore, in most cases, the motor is situated in a watertight case which the juice receptacle covers and thus the receptacle must be given a complicated shape, which makes it difficult to clean and the squeezing cone. In addition, frequently these devices are not stable.

SUMMARY OF THE INVENTION

This invention is intended to remedy these various disadvantages.

It has as its subject an electric device for squeezing citrus fruit, characterized by the fact that it is made up essentially of a fixed male cone and a turning female cone which is superposed on it axially; the fruit half is pressed between the two cones, the female cone being mounted on the lower part of a case, which contains the electric driving motor in its upper part, while the male cone rests, through a collar, on the edges of a juice receptacle which forms the stand of the device.

In what follows, there will be described, with reference to the attached drawing, a non-limiting example for cylindrical execution of the device thus described, and in the course of this description there will appear other characteristics belonging to the invention.

Figure 1:
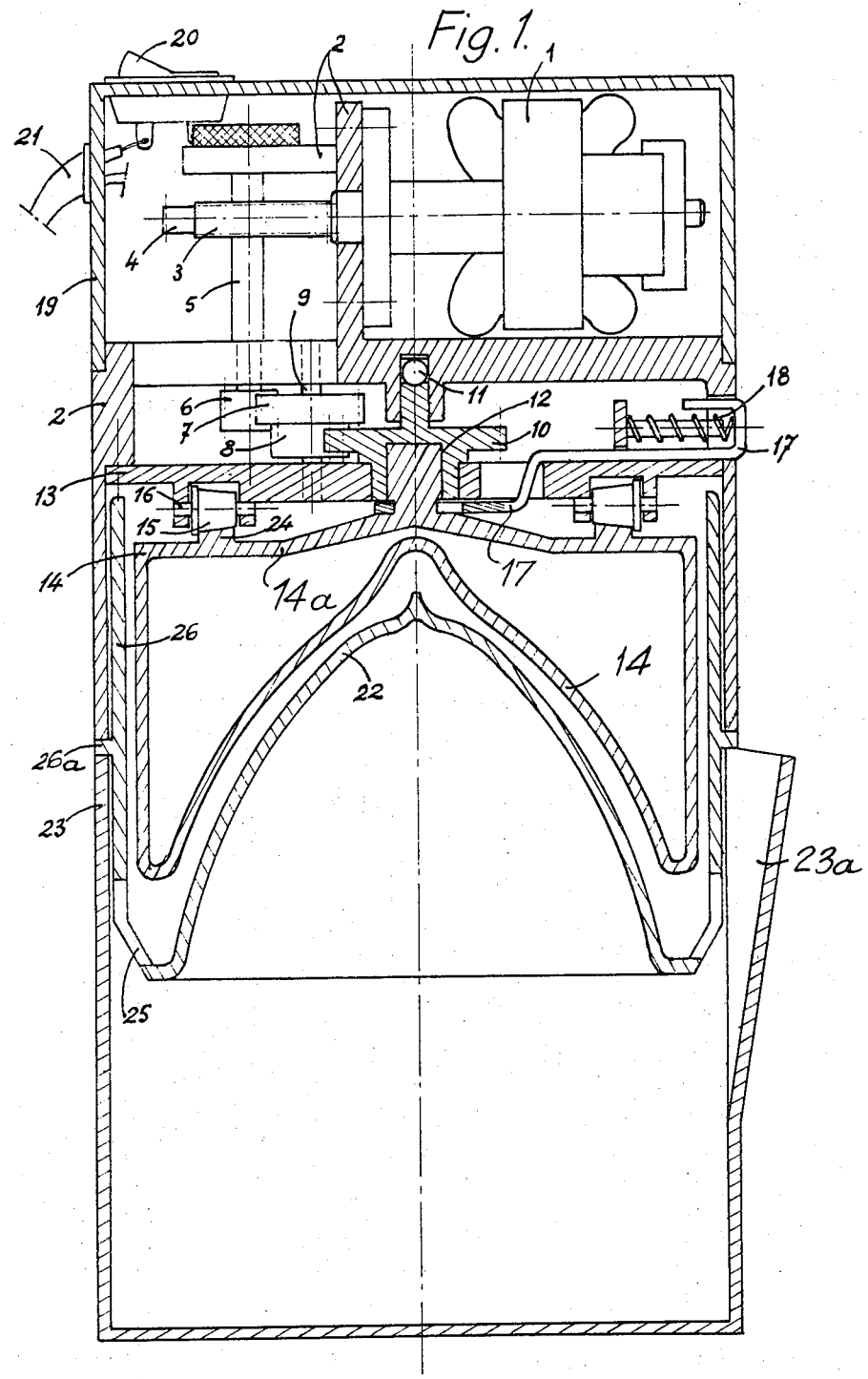
FIG. 1 is a side view in vertical median section of the device while empty.
Figure 2:
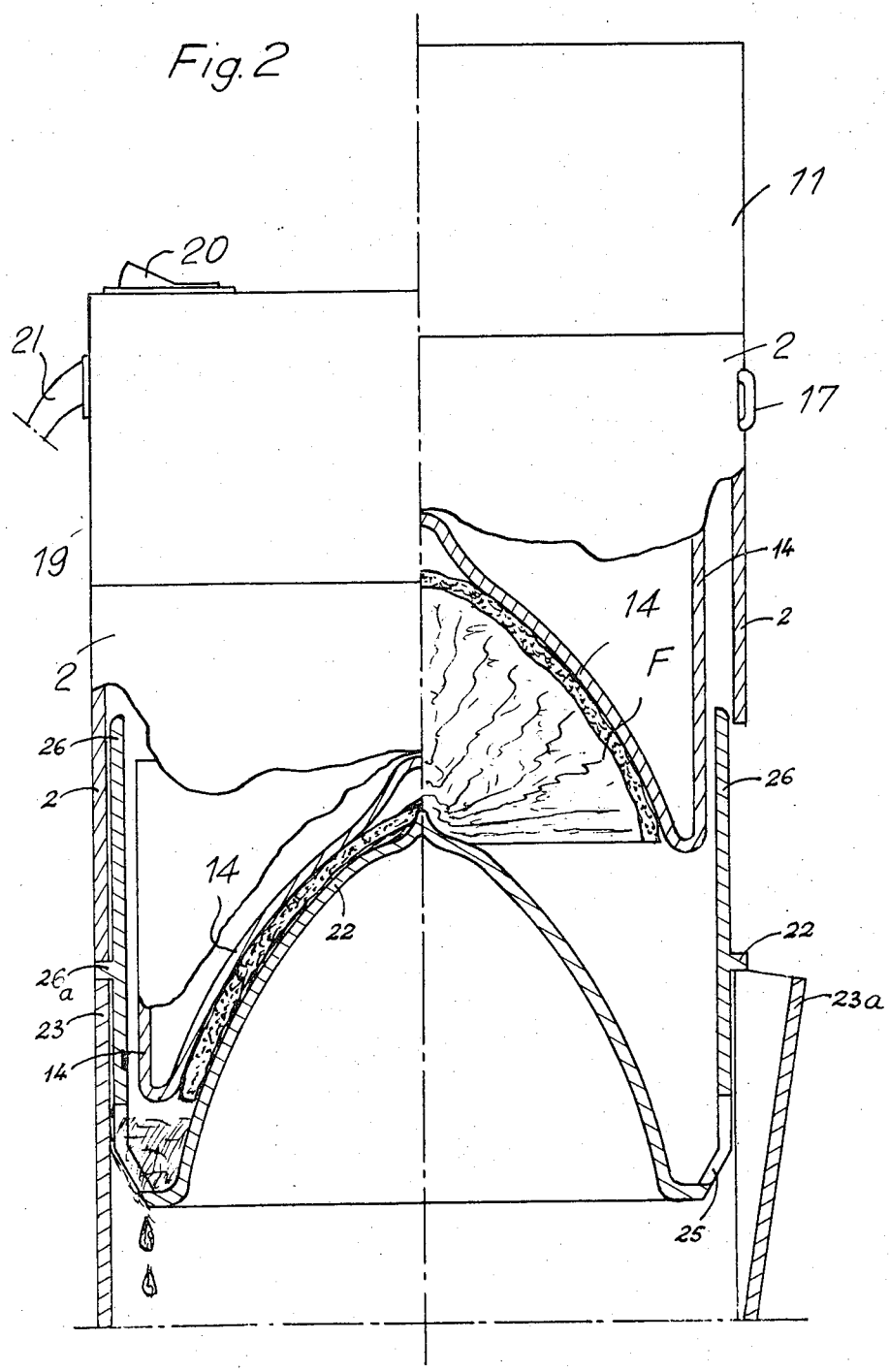

The left half of FIG. 2 shows the same side sectional view as FIG. 1 in a full state during pressing; the right half view shows the device with a fruit half before pressing.

DETAILED DESCRIPTION OF THE PREFERRED EMBODIMENT

As is shown in FIG. 1, the device includes two coaxial cones superposed with play and with their points turned upward, a female cone 14 and a male cone 22.

Female cone 14 is centered in the lower part of a frame 2 making up a case of molded material with cover 19; in the upper part of this case and on the inside of the cover an electric motor 1 is lodged on a horizontal axis. This motor can cause the female cone to rotate around its axis by means of the following transmission.

The shaft of the motor is extended by a screw 3 which engages with a tangent wheel 4 turning on the vertical axle 5 mounted by pivot in case 2. The lower free end of axle 5 has a pinion 6 which transmits its movement to a cogged wheel 7 pivoting on an axle 9 mounted between frame 2 and the bottom wall 13, this bottom wall forming horizontally the housing of the motor and the parts of the transmission. Axle 9 has, under wheel 7, a pinion 8 meshed with a gear wheel 10 pivoting between frame 2 and the bottom wall 13 around the vertical axle of the device. This wheel 10, or socket member can turn on a ball 11 placed in the bore of the frame so as to allow good pivoting despite the vertical thrust occurring during the squeezing of a fruit half.

It will be noticed that the female cone 14 is molded in one single piece with an inverted cylindrical basin, forming a closed space of which the upper part 14a is axially surmounted by a hexagonal nipple 12 or stud removably placed in a corresponding profile of the hollow made during molding in the lower part in wheel 10 out of thermoplastic material. Nipple 12 is locked during the functioning of the device by means of a metallic push-button 17 mounted against a spring 18 on the lateral wall of case 2.

To assure regular rotation of the female cone 14, part 14a is equipped with a crown 24 on which turn conical rollers 15 pivoting on axles 16 which are part of base 13; this arrangement supports and absorbs all the reaction of the fruit squeezing movement. Cover 19 which closes case 2, carries the switch 20 of the motor attached to input wire 21.

The male cone 22 is molded with a cylindrical skirt 26 surrounding it and interposed with play between the cylindrical wall of the case 2 and the cylindrical wall of the space 14, 14a, in order to allow a free guided sliding of case 2 and the female cone.

Skirt 26 has about midway a collar 26a, which allows the male cone 22 to rest on the edges of a cylindrical receptacle 23 forming the stand of the device. At the level of the lower connection of the male cone 22 with skirt 26, narrow slits 25 are pierced for the flow of the fruit juices into receptacle 23, which has laterally a pouring spout 23a.

FIG. 2 is representative of the use and function of the device which has just been described.

Case 2, with all the parts attached to it, (female cone, motor unit, cover), held by hand is separated from the male cone 22 held by the juice receptacle; a fruit half F is placed on male cone 22, as shown by the half-view on the right of FIG. 2; the case is replaced on top of the stand, so that female cone 14 caps the fruit half, the upper edge of the receptacle 26 being more or less engaged between the cylindrical walls of case 2 and of the space 14, 14a, according to the size of the fruit. Switch 20 is depressed, female cone 14 begins to turn, and pressure is progressively applied to the top of the cover 19 by hand while the fruit half is rotated by the female cone. Thus, the stationary male cone causes extraction of the juice; the juice descends along the wall of the male cone, flows through slits 25 and enters receptacle 23.

Hand pressure is continued until upper case 2 hits against collar 26a, as is shown in the half view on the left of the figure. The current is then stopped.

By raising case 2 again and removing it, the pressed fruit half can be removed and the juice in the receptacle may be consumed. During the squeezing the hand has not been soiled by the juice and the electromechanical parts have not been touched by the juice.

For the cleaning of the cones, it is enough to press push-button 17 to remove the female cone and to wash it as well male cone 22 which is removed from the support receptacle; in this way, none of the electrical and mechanical parts of the device will be touched by the washing liquid.

It is obvious that other arrangements for the device of the type described above can be obtained by modifications of the cone designs and the electroreductor group, but these arrangements will remain within the framework of the invention as long as they satisfy the generic definition given at the beginning of this report.

What is claimed is:

1. An electrically operated device for squeezing citrus fruits comprising a case having a cylindrical side wall and an open lower end; an electric motor carried in the upper part of the case; a female cone rotatably driven by the motor and arranged apex-end up in the lower part of the case so that a space exists between the side wall of the case and the female cone; a juice receptacle separate from and disposed below the case, said juice receptacle having an open upper end facing the open lower end of the case; a male cone disposed apex-end up in the upper end of the receptacle and thereby adapted to fit concentrically into the female cone so that a half fruit can be pressed between the cones upon downward movement of the case and female cone; and guide means for axially guiding the case and female cone upon downward movement including a cylindrical skirt concentric to the male cone and a collar intermediate the ends of the skirt, said collar resting on the upper end of the receptacle and serving as a stop to limit downward movement of the case, the portion of the skirt above the collar residing in the space between the side wall of the case and the female cone.

2. A device as in claim 1 wherein said cylindrical skirt is connected to the male cone so as to support the latter by means of the engagement between the collar and the upper end of the receptacle.

3. A device as in claim 2 wherein the female cone is a closed hollow structure having a cylindrical side wall concentric to the male cone and having a top wall transverse to the cones, said top wall carrying an upstanding flat-sided stud located on the axis of the female cone, said device further including a socket member journalled in the case and engaging the stud and rotatably driven by the motor so as to rotate the female cone.

4. A device as in claim 3 including means for releasably locking the stud in the socket, said means including a spring-biased push button mounted in the side wall of the case for movement between a normal locking position and an unlocking position.

5. A device as in claim 3 wherein the stop wall of the female cone carries an upstanding annular crown which is concentric to the axis of the cone, said device including rollers mounted within the case and engaging the crown, and thrust bearing means between the socket and the case.

6. A device as in claim 5 wherein the case includes a horizontal partition intermediate its ends, said partition supporting the rollers, said socket member projecting through said partition.

7. A device as in claim 1 wherein the upper portion of the case includes a cylindrical cover surrounding the motor, said cover including means for receiving an electrical power supply cord and supporting a manual switch for the motor.

8. A device for squeezing citrus fruits comprising: a case having a cylindrical side wall and an open lower end; a rotatable female cone arranged apex-end up in the open lower end, an electric motor carried in the upper part of the case; transmission means disposed within the case for imparting a rotary drive force to the female cone from the motor, said transmission means including a releasable drive connection to the female cone; manually operated means extending between said connection and the exterior of the case for permitting manual locking and unlocking of the connection; roller bearing means disposed between a fixed structure within the case and the female cone for receiving thrust loads imposed on the female cone during a squeezing operation; an open-top juice receptacle separate from and disposed below the case; and a male cone disposed apex-end up in the open top of the receptacle.

* * * * *